United States Patent [19]
Greisz

[11] Patent Number: 5,878,072
[45] Date of Patent: Mar. 2, 1999

[54] LASER ALIGNMENT CROSS HAIR

[75] Inventor: Mark J. Greisz, Vancouver, Wash.

[73] Assignee: SEH America, Inc., Vancouver, Wash.

[21] Appl. No.: 823,622

[22] Filed: Mar. 25, 1997

[51] Int. Cl.⁶ .................................. H01S 3/08; A61B 6/08
[52] U.S. Cl. .............................. 372/103; 372/9; 372/107; 372/108; 372/109; 378/205; 378/206
[58] Field of Search ................................ 372/9, 103, 107, 372/108, 109, 705; 378/205, 206

[56] References Cited

U.S. PATENT DOCUMENTS

| | | | |
|---|---|---|---|
| 3,699,474 | 10/1972 | Landry | 372/103 X |
| 4,154,530 | 5/1979 | Connolly, Jr. et al. | 356/152 |
| 4,223,227 | 9/1980 | Horwitz | 250/491 |
| 4,800,877 | 1/1989 | Losch | 128/4 |
| 5,018,164 | 5/1991 | Brewer et al. | 372/109 |
| 5,077,905 | 1/1992 | Murray, Jr. | 33/412 |
| 5,124,524 | 6/1992 | Schuster et al. | 219/121.78 |
| 5,212,720 | 5/1993 | Landi et al. | 378/206 |
| 5,406,733 | 4/1995 | Tarlton et al. | 42/101 |
| 5,621,831 | 4/1997 | Staver et al. | 385/33 |

FOREIGN PATENT DOCUMENTS 0 350 123 B1  3/1989  European Pat. Off. ........... 372/103 X

*Primary Examiner*—Brian Healy
*Attorney, Agent, or Firm*—Bell Seltzer Intellectual Property Law Group of Alston & Bird LLP

[57] ABSTRACT

An alignment cross hair apparatus for partially eclipsing a laser beam includes a laser generator that emits a laser beam. A frame includes a pair of members that cross one another at an intersection within the frame. The frame is attachable to the laser generator in such a manner that the intersection of the members is within the laser beam so that the laser beam is partially eclipsed by the pair of members.

7 Claims, 2 Drawing Sheets

LASER ALIGNMENT CROSS HAIR

BACKGROUND OF THE INVENTION

The present invention relates to an alignment cross hair apparatus used in connection with aligning a laser beam emitted from a laser.

Infrared lasers, such as yttrium-aluminum-garnet (YAG) lasers are used for scribing identification markings on semiconductor wafers. These identification markings can be located anywhere on the surface of the wafer and in any pattern desired. In manufacturing satisfactory identification markings, the power intensity, location and focus of the laser beam must be carefully controlled. To scribe silicon wafers, the laser beam must pass through several mirrors and lenses before reaching the marking surface, as shown by a typical layout illustrated in FIG. 1. Since the current art for making semiconductor wafers calls for marking tolerances within micrometers, laser beam placement and focus are crucial.

One of the problems inherent with scribing wafers is properly aligning the laser beam through the various optics. Ideally, the laser beam should be aligned so that the center of the laser beam strikes or passes through the center of the various optics along its path. Keeping the center of the laser beam in the center of the optics reduces distortion of the laser beam and minimizes power loss. However, the beam produced by a YAG laser falls in the infrared light spectrum, and cannot be seen by the naked eye. Therefore, to align the laser beam through the optics, either a phosphor-covered disk or an infrared viewing scope may be used to track the location of the laser beam. The phosphor-covered disk, when held in the direct path of the laser beam, produces a visible green image where the beam strikes the phosphor. An infrared viewing scope (a camera-like device) produces an image on a monitor displaying where the beam contacts a surface such as a mirror or lens.

Unfortunately, neither of these methods for viewing the laser beam produces a sharp image of the laser beam. The image produced by both the phosphor and the infrared viewing scope is not proportionally responsive to the intensity of the beam, but instead each has varying response thresholds and shows little differentiation between varying intensities of the beam. The accuracy of the laser beam placement is thus very subjective depending on the response curve and sensitivity of the infrared viewing scope and the phosphor block.

In addition, the properties of an infrared laser beam are such that viewing the beam position is always difficult and subjective. Each person responds differently to the image of the laser beam. This may be due to variations among individuals with respect to the sensitivity of the eye's rods and cones, the brain's interpretation of the image, ambient lighting conditions, and the eye's response to monochromatic light. Along with the eye-related difficulties are the actual properties of the laser beam. A typical laser beam is a circular, gaussian distribution of intensity that is not usually well centered, but instead has the point of greatest intensity displaced somewhat from the exact center of the beam. Thus, the position of greatest intensity of the laser beam may not coincide with the position of the center of the beam.

Adding to this difficulty, the mirrors and lenses used to position and focus the laser beam may be angled and rotated about each of the x, y and z axes to allow the laser beam to be aimed in any direction. However, when the beam strikes a mirror or lens at an oblique angle, this further blurs the image of the infrared laser beam as shown by the phosphor disk or infrared viewing scope, producing an oblong, distorted beam pattern with blurry and indistinguishable edges. Impurities in the optics will also distort the image of the laser beam. This further increases the difficulty of locating the center of the laser beam.

Accordingly, a need has developed that allows a laser beam operator to distinguish the center of the laser beam using different methods of viewing the laser beam, which does not depend upon the intensity of the laser beam, which allows alignment on oblique surfaces, which is not affected by impurities in the optics, and which does not distort the laser beam.

SUMMARY OF THE INVENTION

The present invention overcomes the foregoing drawbacks of the prior art by providing an alignment cross hair apparatus for partially eclipsing a laser beam that allows observation of the center of the laser beam. The apparatus includes a laser generator that emits a laser beam. A frame includes at least a pair of members that cross one another at an intersection within the frame. The frame is attachable to the laser generator in such a manner that the intersection of the pair of members is within the laser beam so that the laser beam is partially eclipsed by the pair of members.

The present invention has several advantages over the prior art. The present invention makes it possible to distinguish the center of the beam by eclipsing the laser beam at the center of the laser beam. The laser beam therefore is displayed as four quadrants that are clearly viewable using all viewing methods. Separating the quadrants is an "x", which is the shadow produced by the pair of members eclipsing the laser beam. The center of the x on the viewing scope denotes the center of the laser beam. This allows adjustment of the beam by viewing the projected x and positioning the x within the optics as needed.

The location of the projected x is clearly viewable regardless of variations in intensity of the laser beam. In addition, perception of the location of the center of the beam is not affected by the eye's response to light because the projected x is displayed as the absence of light. This eliminates the subjectivity of perception inherent in the conventional method of viewing the laser beam. The location of the x is also observable on oblique surfaces, such as mirrors and optics. The projected x is also not affected by impurities on the optics. Because the apparatus does not use optics to eclipse the laser beam, the apparatus has no significant effect on the laser beam for purposes of alignment.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
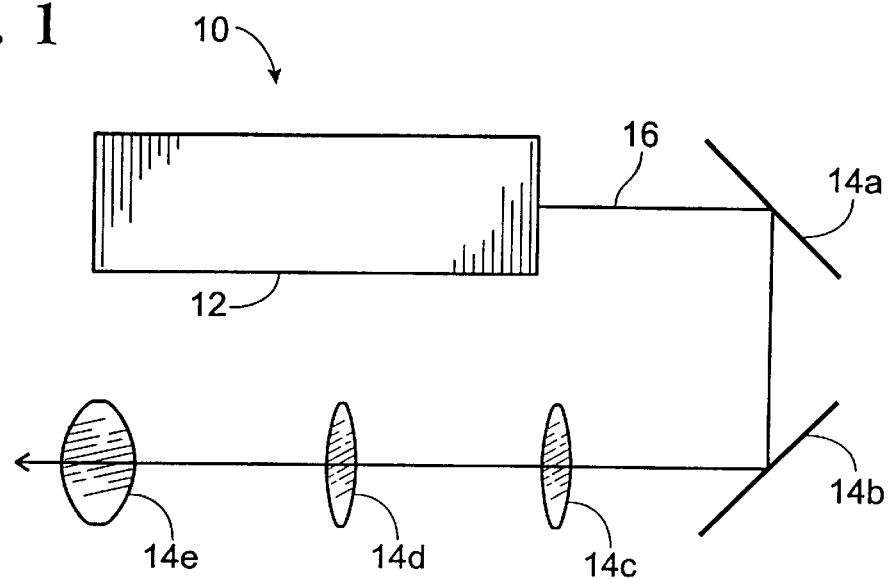
FIG. 1 is a schematic diagram of a conventional optics layout for scribing markings on a silicon wafer.

Referring now to the drawings, wherein like numerals refer to the same elements, FIG. 1 is a schematic diagram for a conventional layout 10 of a laser generator 12 and optics 14a and 14b (mirrors) and 14c, 14d and 14e (lenses) used for scribing markings on a silicon wafer. A laser beam 16 is emitted from the laser generator 12 and passes through the various optics before striking the silicon wafer (not shown) on which the identification markings are scribed.

Figure 2:
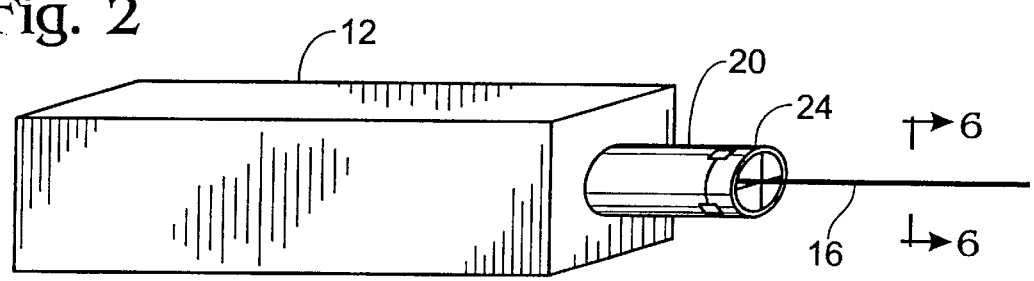
FIG. 2 is a perspective view of a simplified exemplary embodiment of the present invention.
Figure 3:
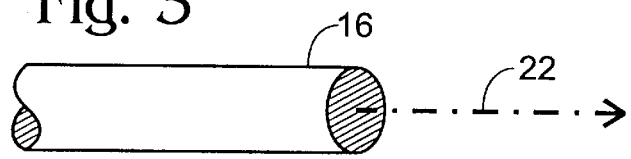
FIG. 3 is a perspective view of a laser beam.

FIG. 2 shows the alignment cross hair apparatus 18 of the present invention. Laser generator 12 is preferably a yttrium aluminum garnet laser (YAG laser) that emits an infrared laser beam 16, but the present invention may be employed with any type of laser generator and any type of laser beam. Laser generator 12 emits a laser beam 16 that passes through a beam expander having an external circular aperture 20 preferably about 1¼ inch in diameter. Frame 24 is attached to aperture 20. FIG. 3 is a perspective view of the laser beam 16a within aperture 20 which has a central longitudinal axis 22 along the center of the laser beam 16.

Figure 4:
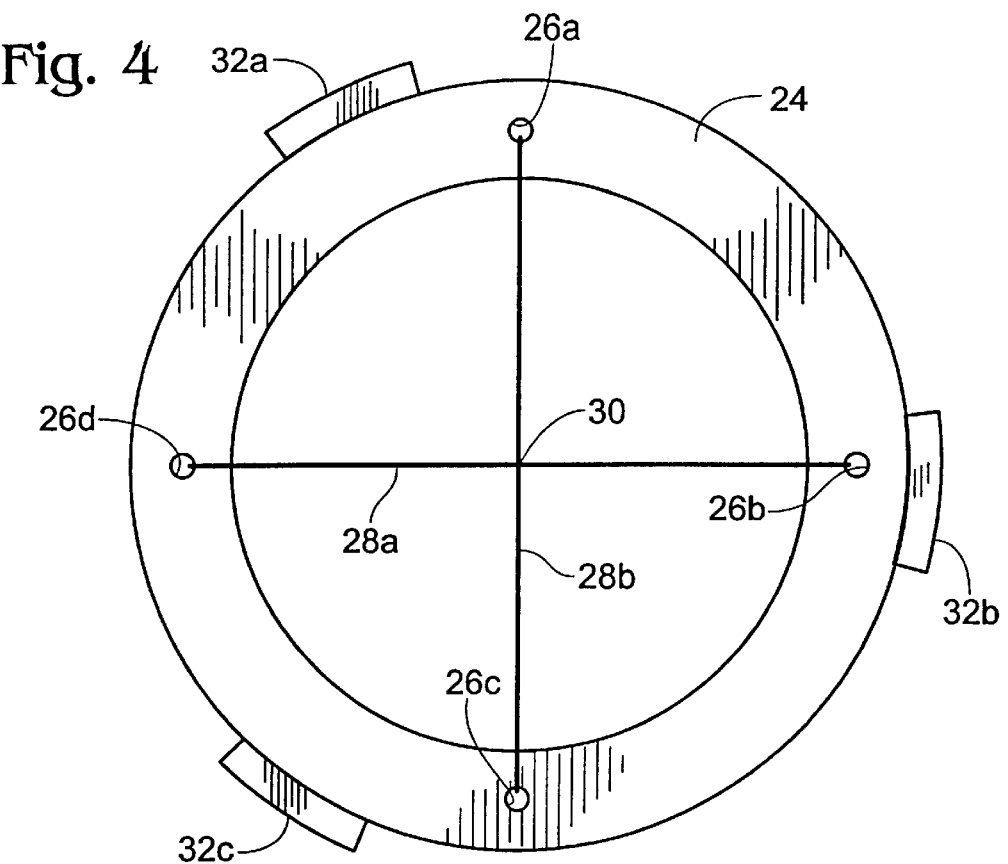
FIG. 4 is a front view of the cross hair frame portion of an embodiment of the present invention.

FIG. 4 is a front view of frame 24. Frame 24 is circular, having an outside diameter generally the same as aperture 20 and is preferably made from aluminum, although any other suitable durable material will do. Frame 24 has a multiplicity of holes 26a, 26b, 26c and 26d, along its periphery to accommodate at least one pair of members 28a and 28b, which are threaded through the holes 26a–26d and attached to frame 24 by welding or other suitable method. Holes 26a–26d are preferably located on frame 24 so that the pair of members 28a and 28b are perpendicular to one another and the intersection 30 is located approximately at the center of the frame 24. In apparatus 18 the members 28a and 28b are preferably of polished stainless steel safety wire with a diameter of 0.02 inch. Stainless steel which has not been polished may absorb too much heat and warp or melt. Other materials could be used to form members 28a and 28b, so long as the members are generally straight and capable of withstanding temperature variations so as not to melt or warp upon exposure to the laser beam. Accordingly, materials like aluminum or copper should not be used for the members. The width of the members will depend on the intensity, distribution and width of the laser beam. In general, the members should be as narrow as possible to reduce the amount of absorbed heat. On the other hand, as discussed below, the members cannot be too thin or else the laser beam will distort and refract around the members and not produce the image needed to locate the center of the beam 16.

Figure 5:
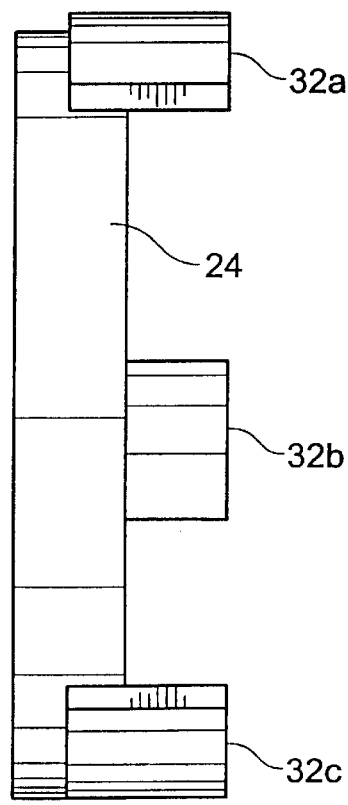
FIG. 5 is a side view of FIG. 4.

Frame 24 is attachable to the aperture 20 of the laser generator 12. FIG. 5 is a side view of frame 24. Tabs 32a, 32b and 32c are located at the periphery of frame 24 and slip over aperture 20. It is preferred that tabs 32a–32c are spring-like and are positioned so that tabs 32a–32c press against aperture 20, thus holding frame 24 securely in place on aperture 20. Tabs 32a–32c are also positioned on frame 24 so that the intersection 30 of the pair of members 28a and 28b is located approximately at the center of laser beam 16. It is preferred that intersection 30 be as close to the center of the laser beam 30 as possible.

When frame 24 is attached to laser generator 12, intersection 30 approximately coincides with the central longitudinal axis 22 of laser beam 16. Thus, when frame 24 is attached to laser generator 12, the intersection 30 is within laser beam 16 and the beam is partially eclipsed by the pair of members 28a and 28b. In addition, each of the pair of members 28a and 28b is aligned perpendicular to the beam's central longitudinal axis 22.

In frame 24, members 28a and 28b are shown as being in physical contact with one another. However, it is not necessary for members 28a and 28b to touch, and therefore they could be spaced apart from one another.

Figure 6:
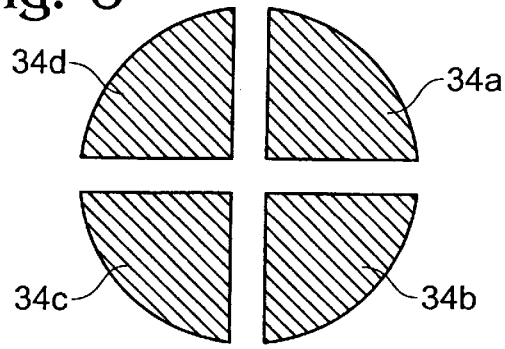
FIG. 6 is a cross sectional view taken along the plane 6—6 of FIG. 2 of a laser beam partially eclipsed by the present invention.

The apparatus 18 makes it possible to distinguish the center of the laser beam 16. FIG. 6 is a schematic cross sectional view of laser beam 16 after it has been partially eclipsed by the pair of members 28a and 28b, whereby the beam is visually separated into four quadrants 34a, 34b, 34c and 34d. When an image of laser beam 16 is displayed on a phosphor block or an infrared viewing scope, the image displayed will be of the four quadrants 34a–34d of laser beam 16 separated by an absence of light in the pattern of an "x." The x is the shadow produced by the pair of members 28a and 28b eclipsing laser beam 16. The center of the x in the image denotes the approximate location of the center of the laser beam 16.

The amount of laser beam 16 eclipsed by the members 28a and 28b depends on the width of the members. If the members 28a and 28b are too narrow, then the laser beam will refract around the members and a shadow, or projected x, will not be imaged. However, if too much of laser beam 16 is eclipsed, then the center of the laser beam will be difficult to locate. In apparatus 18, the laser beam 16 has a diameter of 5 mm at the point where the beam 16 is eclipsed by members 28a and 28b, and the members 28a and 28b are 0.02 inch in diameter, producing the optimal image for locating the center of laser beam 16.

The location of the projected x is clearly viewable using both the phosphor block and infrared viewing scope methods. The apparent position of the x is not dependent on the intensity of laser beam 16, and does not vary with variations in the beam's intensity. Because the viewer observes a shadow instead of monochromatic light, the apparent position of the x is not affected by an individual's sensitivity to light or ambient lighting conditions. In addition, because the position of the x is not dependent on the intensity of laser beam 16, the position of the center of the beam is observable even if the position of greatest intensity of the beam is off-center.

The projected x is also viewable on oblique surfaces, such as mirrors and lenses, and is further not affected by optical impurities. Finally, because apparatus 18 does not use optics such as lenses or mirrors, the laser beam 16 is not significantly affected by apparatus 18 for purposes of aligning laser beam 16.

To align laser beam 16, frame 24 is attached to aperture 20 of laser generator 12. The operator views laser beam 16 using a phosphor block, infrared viewing scope, or other imaging method. The operator aligns laser beam 16 by adjusting the optics to place the projected x at the desired position on the optics. When laser beam 16 is satisfactorily aligned, frame 24 is removed from laser generator 12 so that the silicon wafers may be scribed. Because the present invention does not use any optics such as lenses or mirrors, the alignment of laser beam 16 remains unchanged when frame 24 is removed from laser generator 12.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. Alignment cross hair apparatus for partially eclipsing a laser beam, comprising
   (a) a laser generator that emits said laser beam, and
   (b) a frame that defines an opening and includes at least a pair of wires that extend across the opening and that cross one another at an intersection within said frame
   wherein said frame is attachable to said laser generator in such a manner that said intersection of said wires is within said laser beam so that said laser beam is partially eclipsed by said pair of wires.

2. The apparatus of claim 1 wherein said laser beam has a central longitudinal axis and said intersection coincides with said axis.

3. The apparatus of claim 1 wherein said pair of wires are each aligned perpendicular to said longitudinal axis of said laser beam.

4. Alignment cross hair apparatus for partially eclipsing a laser beam, comprising
   (a) a laser generator that emits said laser beam, wherein said laser generator emits an infrared laser beam; and
   (b) a frame that defines an opening and includes at least a pair of wires that extend across the opening and that cross one another at an intersection within said frame
   wherein said frame is attachable to said laser generator in such a manner that said intersection of said wires is within said laser beam so that said laser beam is partially eclipsed by said pair of wires.

5. The apparatus of claim 1 wherein said pair of wires are aligned perpendicularly to one another.

6. The apparatus of claim 1 wherein said pair of wires contact one another at said intersection.

7. The apparatus of claim 1 wherein said frame is circular.

* * * * *

UNITED STATES PATENT AND TRADEMARK OFFICE
CERTIFICATE OF CORRECTION

PATENT NO. : 5,878,072

DATED : March 2, 1999

INVENTOR(S) : Greisz

It is certified that error appears in the above-identified patent and that said Letters Patent is hereby corrected as shown below:

Column 5, line 15, "claim 1" should read --claim 2--.

Signed and Sealed this

Sixth Day of July, 1999

Attest:

Q. TODD DICKINSON

*Attesting Officer*     *Acting Commissioner of Patents and Trademarks*